(12) United States Patent
Gutierrez et al.

(10) Patent No.: US 11,053,452 B2
(45) Date of Patent: Jul. 6, 2021

(54) PROCESS FOR PURIFYING RENEWABLE FEEDSTOCK COMPRISING FATTY ACIDS

(71) Applicant: UPM-KYMMENE CORPORATION, Helsinki (FI)

(72) Inventors: Andrea Gutierrez, Espoo (FI); Thomas Björklöf, Helsinki (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 0 days.

(21) Appl. No.: 16/713,247

(22) Filed: Dec. 13, 2019

(65) Prior Publication Data

US 2020/0190427 A1 Jun. 18, 2020

(30) Foreign Application Priority Data

Dec. 14, 2018 (FI) ..................................... 20186083

(51) Int. Cl.
*C11B 3/00* (2006.01)
*C11B 13/00* (2006.01)

(52) U.S. Cl.
CPC ............... *C11B 3/00* (2013.01); *C11B 13/00* (2013.01)

(58) Field of Classification Search
CPC .... C10G 3/00; C10G 3/50; C11B 3/00; C11B 3/001
USPC ............................................ 554/177; 44/308
See application file for complete search history.

(56) References Cited

U.S. PATENT DOCUMENTS

| 2,525,892 | A | * | 10/1950 | Gates | ........................ | C09F 1/00 |
| | | | | | | 530/209 |
| 2,791,577 | A | * | 5/1957 | Outterson | ............. | C11B 13/005 |
| | | | | | | 530/209 |
| 2011/0047866 | A1 | * | 3/2011 | Bao | ........................... | C11B 3/04 |
| | | | | | | 44/605 |
| 2011/0049012 | A1 | * | 3/2011 | Stigsson | ................... | C11B 3/10 |
| | | | | | | 208/88 |
| 2016/0244394 | A1 | * | 8/2016 | Bieser | ..................... | C07C 51/16 |

FOREIGN PATENT DOCUMENTS

| CN | 101619274 A | 1/2010 |
| EP | 3263675 A1 | 1/2018 |
| FI | 20125709 A | 12/2013 |
| FI | 124885 B | 3/2015 |
| FI | 127333 B | 4/2018 |
| WO | 2009072468 A1 | 6/2009 |
| WO | 2010021753 A1 | 2/2010 |
| WO | 2010097519 A2 | 9/2010 |
| WO | 2018060324 A1 | 4/2018 |

* cited by examiner

*Primary Examiner* — Deborah D Carr
(74) *Attorney, Agent, or Firm* — Cantor Colburn LLP (57) ABSTRACT

The present invention relates to a process for purifying renewable feedstock comprising fatty acids, said process comprising the steps, where the renewable feedstock comprising fatty acids comprises at least one acid oil and at least another renewable feedstock, and it is treated with an aqueous medium, to obtain a mixture, and a first stream comprising water is separated from said mixture and a second stream comprising fatty acids is obtained as purified renewable feedstock.

27 Claims, 5 Drawing Sheets

PROCESS FOR PURIFYING RENEWABLE FEEDSTOCK COMPRISING FATTY ACIDS

CROSS-REFERENCE TO RELATED APPLICATION

This application claims benefit of Finnish Patent Application No. 20186083 filed on Dec. 14, 2018, which is incorporated by reference herein in its entirety.

FIELD OF THE INVENTION

The present invention relates to a process for purifying renewable feedstock comprising fatty acids. The feedstock, originating from renewable materials, is subjected to purification where impurities are removed. The purified feedstock comprising fatty acids may be converted to products comprising hydrocarbons, suitable as fuels or fuel components. The purified feedstock comprising fatty acids is suitable as feed for biofuel production.

BACKGROUND OF THE INVENTION

There is an increasing interest in alternative feedstocks for replacing at least partly crude oil, in the production of hydrocarbons, suitable as fuels or fuel components, for example as transportation fuels, or compatible with fuels. Biofuels are typically manufactured from feedstock originating from renewable sources including oils and fats obtained from plants, animals, algal materials, fish, and various waste streams, side streams and sewage sludge. These feedstocks, particularly the various waste streams and side streams, contain varying amounts of contaminants, such as gums, phospholipids and other phosphorus compounds, metals and metal compounds, which are, for example, deleterious to converting catalysts.

Plant oils and animal fats are conventionally pretreated with degumming, evaporation and/or bleaching processes, which are designed to remove or at least minimize the content of contaminants in said materials. Lye is often used for saponification of fatty acids whereby they are separated alongside with impurities, such as phosphorus compounds. Bleaching generates significant amounts of spent bleaching earth as waste. Further, both processes entail a yield loss, as oil is removed with the impurities.

Despite the ongoing research and development in the processing of renewable feedstocks and manufacture of fuels, there is still a need to provide an improved process for purifying renewable feedstock comprising fatty acids to provide purified feedstock, which is suitable for converting to valuable chemicals, such as hydrocarbons suitable as fuels or fuel blending components.

SUMMARY OF THE INVENTION

An object of the invention is to provide a process for purifying renewable feedstock comprising fatty acids.

One aspect is a process for purifying renewable feedstock comprising fatty acids, where said process comprises the steps, where the renewable feedstock comprising fatty acids comprises at least one acid oil and at least another renewable feedstock, and said renewable feedstock comprising fatty acids is treated with an aqueous medium at the temperature from 140 to 195° C., under a pressure from 0.1 to 70 bar (abs), and where the ratio of the renewable feedstock comprising fatty acids to the aqueous medium is from 1:5 to 5:1, respectively, to obtain a mixture; and a first stream comprising water and a second stream comprising fatty acids are separated from said mixture, and the second stream is obtained as purified renewable feedstock.

Another aspect provides purified feedstock comprising fatty acids obtained by said process.

Characteristic features of the invention are presented in the appended claims.

Definitions

Fatty acids refer here to free C4-C26 fatty acids, typically present in feedstocks originating from renewable sources.

Free fatty acids refer here to fatty acids that are not present as esters or acylglycerols or other bound derivatives of said acids.

The term "acylglycerol" refer here to esters formed from glycerol and fatty acids, linked by acylglyceride linkage between the fatty acid and at least one of the hydroxyl groups of glycerol.

The term "unsaponifiables" refers here to substances which cannot be saponified by caustic treatment, such as higher aliphatic alcohols, sterols, and hydrocarbons, particularly fatty alcohols (C20-C24), sterols (C30) and carotenes, and various other alkyl- and cycloalkyl hydrocarbon derivatives (C10-C30).

The term "first stream" refers here to a stream comprising water. The first stream is an aqueous stream or aqueous phase, which is separated from the mixture obtained in the process, where the renewable feedstock comprising fatty acids is treated with the aqueous medium. The first stream comprises water and it may comprise water soluble and water miscible compounds, particularly impurities separated from the renewable feedstock.

The term "second stream" refers here to an oily stream or oil phase, which is separated from the mixture obtained in the process, where the renewable feedstock comprising fatty acids is treated with the aqueous medium. The second stream comprises free fatty acids, and optionally unsaponifiables and/or acylglycerols, if they were present in the feedstock.

Transportation fuels refer here to fractions or cuts or blends of hydrocarbons having distillation curves standardized for fuels, such as for diesel fuel (middle distillate from 160 to 380° C., according to EN 590), gasoline (40-210° C., according to EN 228), aviation fuel (160 to 300° C., according to ASTM D-1655 jet fuel), kerosene, naphtha, etc. Liquid fuels are hydrocarbons having distillation curves standardized for fuels, such as transportation fuels.

The term "biofuel" refers here to liquid fuels obtained from renewable feedstock, e.g. feedstock of biological origin.

DETAILED DESCRIPTION OF THE INVENTION

An industrially effective and sustainable process for purifying renewable feedstock comprising fatty acids is provided, where the various impurities, including phosphorus, alkali metals, alkaline earth metals and other metals can be removed from the feedstock effectively and economically, while maintaining the structure of valuable compounds. The purified renewable feedstock is particularly suitable as feedstock for hydroprocessing in biofuel manufacture. The purification process releases effectively moieties containing particularly phosphorus, and alkali metals, alkaline earth metals and other metals, from compounds present in the feedstock, without breaking or degrading valuable feed materials or without effecting hydrolysis of any acylglycerols, or at least maintaining said hydrolysis on a very negligible level. The valuable organic compounds are maintained in the oil phase, confirmed by low total organic carbon (TOC) in the aqueous phase, and the impurities are typically present in the aqueous phase. The process is particularly suitable for purifying low grade oils, waste oils, residue oils and the like, such as combinations of acid oils and crude tall oil, and it provides an improved alternative for degumming and bleaching of oils.

One aspect is a process for purifying renewable feedstock comprising fatty acids, wherein said process comprises the steps, where the renewable feedstock comprising fatty acids comprises at least one acid oil and at least another renewable feedstock, and said renewable feedstock comprising fatty acids is treated with an aqueous medium, at the temperature from 140 to 195° C., under a pressure from 0.1 to 70 bar (abs), and where the ratio of the renewable feedstock comprising fatty acids to the aqueous medium is from 1:5 to 5:1, respectively, to obtain a mixture, and a first stream comprising water and a second stream comprising fatty acids are separated from said mixture, and the second stream is obtained as purified renewable feedstock.

In an embodiment, the purified renewable feedstock comprises not more than 50 mg/kg phosphorus, calculated as elemental phosphorus.

In a preferable embodiment, the purified renewable feedstock comprises not more than 10 mg/kg, preferably not more than 5 mg/kg phosphorus, calculated as elemental phosphorus.

In an embodiment, the purified renewable feedstock comprises not more than 100 mg/kg of alkali metals, alkaline earth metals, metals of the groups VIIB and VIIIB of the Periodic table of elements or combinations thereof, calculated as elemental metals, in total.

In an embodiment, the purified renewable feedstock comprises not more than 50 mg/kg alkali metals, alkaline earth metals, metals of the groups VIIB and VIIIB of the Periodic table of elements (other metals), or combinations thereof, calculated as elemental metals, in total, preferably not more than 20 mg/kg, more preferably not more than 10 mg/kg.

In an embodiment, the first stream comprising water comprises not more than 10 000 mg/kg total organic carbon. In another embodiment, the first stream comprising water comprises not more than 5 000 mg/kg total organic carbon. The total organic carbon (TOC) is measured using SFS-EN1484 standard method.

In an embodiment, the purified renewable feedstock comprises not more than 50 mg/kg phosphorus and not more than 100 mg/kg alkali metals, alkaline earth metals, metals of the groups VIIB and VIIIB of the Periodic table of elements, or combinations thereof and the first stream comprising water comprises not more than 10 000 mg/kg total organic carbon.

Accordingly, the renewable feedstock comprising at least one acid oil and at least another renewable feedstock, is subjected to purification with an aqueous medium, whereby a first stream comprising water, phosphorus containing moieties, silicon containing moieties, alkali metals, alkaline earth metals, metals of the groups VIIB and VIIIB of the Periodic table of elements, such as Fe and Mn, and possibly some water soluble or water miscible organic compounds are separated from a second stream comprising fatty acids and some residual water. The second stream comprising fatty acids may also comprise some acylglycerols and/or unsaponifiables, if contained in the feedstock.

In an embodiment, the aqueous medium comprises an acid selected from sulfuric acid and C1-C10 organic acids.

In an embodiment, the second stream comprising fatty acids, is subjected to a fractionation step. A gaseous fraction, if any, a light liquid fraction and a heavy liquid fraction may be obtained.

The gaseous fraction typically comprises water and C1-C4 compounds.

The light liquid fraction typically comprises fatty acids having carbon number C4-C26. The light liquid fraction may optionally comprise also acylglycerols and/or esters and/or unsaponifiables, if contained in the feedstock.

The heavy liquid fraction typically comprises compounds having carbon number of at least C24 or higher and polymerized compounds.

In an embodiment, the second stream comprising fatty acids is directed to a hydroprocessing step.

In another embodiment, the light liquid fraction, obtained by fractionation of said second stream, is directed to a hydroprocessing step.

Figure 1:
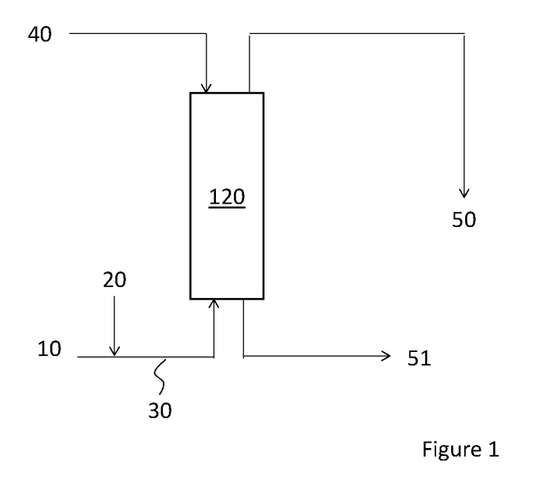
FIG. 1 is a schematic flow diagram representing one embodiment of the purification process.

In FIG. 1 an aqueous medium (40) is fed to purification step (120) and acid oil (10) is mixed with crude tall oil (another renewable feedstock) (20) to obtain renewable feedstock comprising fatty acids (30), which is fed to purification step (120), where purification and separation are carried out, suitably in an extraction column, by treating the renewable feedstock comprising fatty acids (30) with said aqueous medium (40), optionally in the presence of steam (not shown in the figure). A first stream (aqueous stream) comprising impurities (51) is obtained and a second stream comprising oil (50) (the purified renewable feedstock) is obtained. Said stream (50) may optionally be directed to drying (not shown in the figure). Optionally, at least part of the aqueous stream (51) may be recirculated to the aqueous medium (40) (not shown in the figure).

Figure 2:
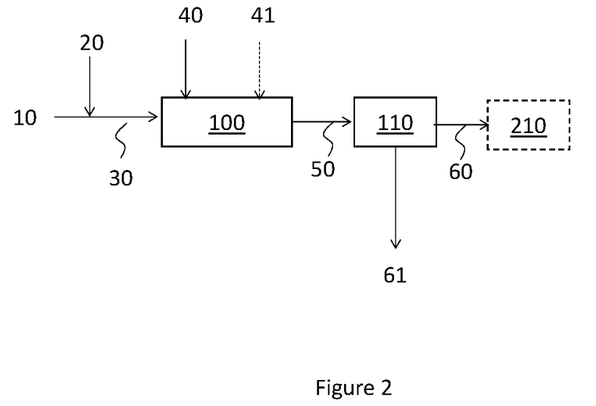
FIG. 2 is a schematic flow diagram representing another embodiment of the purification process.

In FIG. 2 acid oil (10) is mixed with crude tall oil (another renewable feedstock) (20) to obtain renewable feedstock comprising fatty acids (30), which is fed to purification step (100) and treated with an aqueous medium comprising an acid (40), optionally in the presence of steam (41), whereby a mixture (50) is obtained. The mixture (50) is directed to a separation step (110). A first stream (aqueous stream) comprising impurities (61) is separated in the separation step (110) and a second stream comprising free fatty acids (60) is obtained. The second stream comprising free fatty acids (60) may optionally be directed to storage in a storage tank (210).

Figure 3:
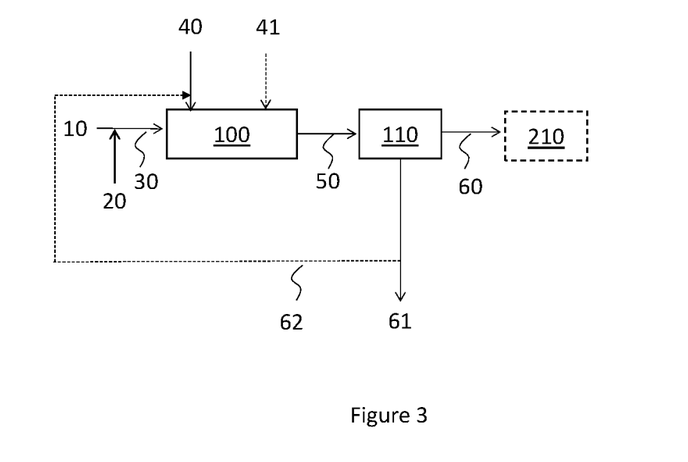
FIG. 3 is a schematic flow diagram representing another embodiment of the purification process.

In FIG. 3 acid oil (10) is mixed with crude tall oil (another renewable feedstock) (20) to obtain renewable feedstock comprising fatty acids (30), which is fed to a purification step (100) and treated with an aqueous medium comprising an acid (40), optionally in the presence of steam (41), whereby a mixture (50) is obtained. The mixture (50) is directed to a separation step (110). A first stream (aqueous stream) comprising impurities (61) is separated in a separation step (110) and a second stream comprising free fatty acids (60) is obtained. Optionally, at least part (62) of the aqueous stream (61) is recirculated to the aqueous medium (40). The second stream comprising free fatty acids (60) may optionally be directed to storage in a storage tank (210).

Figure 4:
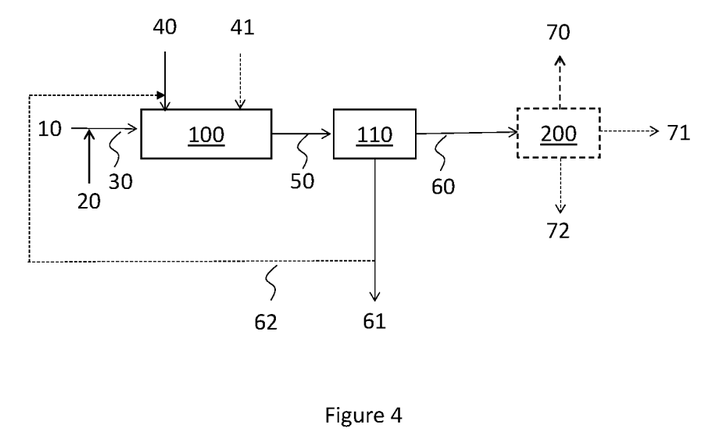
FIG. 4 is a schematic flow diagram representing another embodiment of the purification process.

In FIG. 4 acid oil (10) is mixed with crude tall oil (another renewable feedstock) (20) to obtain renewable feedstock comprising fatty acids (30), which is fed to a purification step (100) and treated with an aqueous medium comprising an acid (40), optionally in the presence of steam (41), whereby a mixture (50) is obtained. The mixture (50) is directed to a separation step (110). A first stream (aqueous stream) comprising impurities (61) is separated in a separation step (110) and a second stream comprising free fatty acids (60) is obtained. Optionally, at least part (62) of the aqueous stream (61) is recirculated to the aqueous medium (40). The stream comprising free fatty acids (60) is optionally subjected to fractionation in a fractionation step (200). The fractionation step (200) may be for example fractional distillation utilizing at least one fractionation distillation column. A gaseous fraction (70), a light liquid fraction (71) and a heavy liquid fraction (72) are separated.

Figure 5:
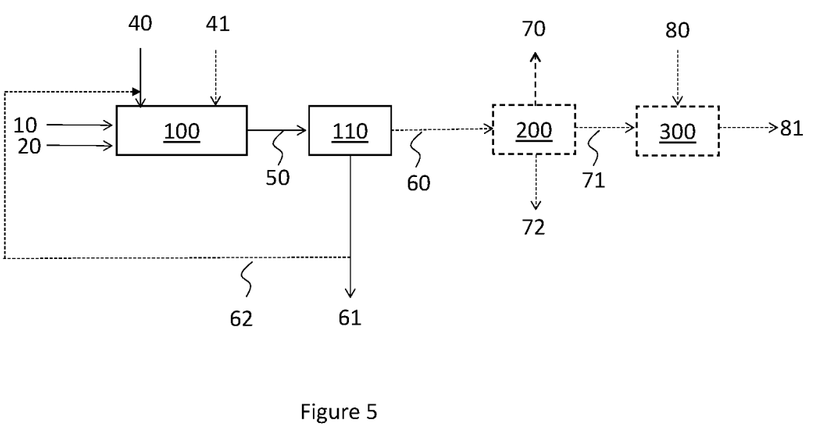
FIG. 5 is a schematic flow diagram representing another embodiment of the purification process.

In FIG. 5 acid oil (10) and crude tall oil (another renewable feedstock) (20) are fed to a purification step (100) to obtain renewable feedstock comprising fatty acids (30), which is treated in the purification step (100) with an aqueous medium comprising an acid (40), optionally in the presence of steam (41), whereby a mixture (50) is obtained. The mixture (50) is directed to a separation step (110). A first stream (aqueous stream) comprising impurities (61) is separated in a separation step (110) and a second stream comprising free fatty acids (60) is obtained. Optionally, at least part (62) of the aqueous stream (61) is recirculated to the aqueous medium (40). The stream comprising free fatty acids (60) is optionally subjected to fractionation in a fractionation step (200). The fractionation step (200) may be for example fractional distillation utilizing at least one fractionation distillation column. A gaseous fraction (70), a light liquid fraction (71) and a heavy liquid fraction (72) are separated. The light liquid fraction (71) is optionally converted catalytically in the hydroprocessing step (300) in the presence of hydrogen (80) to obtain an effluent (81).

Renewable Feedstock Comprising Fatty Acids

The renewable feedstock originates from renewable or biological source or sources, and it is meant to include here feedstock other than those obtained from mineral oil or coal.

The renewable feedstock comprising fatty acids comprises at least one acid oil and at least another renewable feedstock.

In an embodiment, the renewable feedstock comprising fatty acids, comprises 0.1-100% by weight of fatty acids.

In an embodiment, the renewable feedstock comprising fatty acids, comprises at least 10% by weight of fatty acids.

In an embodiment, the renewable feedstock comprising fatty acids, comprises 10-100% by weight of fatty acids.

In an embodiment, the renewable feedstock comprising fatty acids, comprises 30-100% by weight of fatty acids.

In an embodiment, the renewable feedstock comprising fatty acids, comprises 50-100% by weight of fatty acids.

In an embodiment, the renewable feedstock comprising fatty acids, comprises 70-100% by weight of fatty acids.

In another embodiment, the renewable feedstock comprising fatty acids, comprises 20-90% by weight of fatty acids, preferably 25-80% by weight of fatty acids.

Acid oil refers here to acidic oil fractions obtained from the processing and/or refining of plant derived and/or animal derived fractions comprising free and/or bound fatty acids, and any combinations thereof. Acid oils are acidulated soaps, i.e. acidulated soap-stocks from chemical refining of plant material, acidulated soap-stocks from chemical refining of plant oils, acidulated soap-stocks from chemical refining of animal fats, acidulated soap-stocks from pulp production (Kraft pulp).

Acid oils contain typically free fatty acids in an amount of at least 10 wt %. Acid oils contain long chain fatty acids typically having carbon number between C8 and C24, mainly between C16 and C18, mineral acids, phospholipids and sterols. Acid oils are cheap and readily available by-products in significant quantities, obtainable particularly from plant oil refining.

Typically, acid oils comprise high amounts of impurities. Acid oils comprise phosphorus, alkali metals, alkaline earth metals, metals of the groups VIIB and VIIIB of the Periodic table of elements, such as iron and manganese, which are difficult and/costly to remove, and they cause problems in catalytic treatment of said feedstocks.

Acid oils containing even high amounts of impurities may be successfully used as feedstock in the present process. Acid oils have typically lower density than that of many other renewable feedstocks.

Acid oil comprising phosphorus is typically regarded as not suitable for catalytic treatment because phosphorus is an effective catalyst poison. It is generally regarded as difficult and uneconomic to remove phosphorus from acid oils comprising high amounts of free fatty acids. Phosphorus may be bound in phospholipids (gums) and/or in other compounds, which are particularly difficult to remove from acid oils by methods such as degumming or other conventional pre-treatment methods. In degumming, NaOH is typically used for adjusting the pH to a suitable range for removing phosphorus. NaOH forms soaps with the fatty acids, which leads to yield losses. Acid oils may comprise even more than 1 000 mg/kg of phosphorus.

Acid oil comprising one or more of alkali metals, alkaline earth metals, and metals of the groups VIIB and VIIIB of the Periodic table of elements (other metals), even in low amounts is often regarded as not suitable for catalytic treatment because each of said metals is an effective catalyst poison. The alkali metals, alkaline earth metals and metals may typically be any one of Mg, Ca, K, Na, Mn and Fe, or a combination thereof.

Acid oils comprising high amounts of free fatty acids, may successfully be used as feedstock in the present process.

In an embodiment, acid oil comprising up to 5000 mg/kg, in total, of one or more of alkali metals, and alkaline earth metals and metals of the groups VIIB and VIIIB of the Periodic table of elements, and at least 10 wt % of free fatty acids, may successfully be used as feedstock.

In an embodiment, acid oil comprising up to 1000 mg/kg of phosphorus, and at least 10% by weight of free fatty acids, may successfully be used as feedstock.

The renewable feedstock comprising fatty acids comprises at least one acid oil and additionally, at least another renewable feedstock.

A great diversity of other renewable feedstocks, in addition to acid oils, is available as feedstock in the process.

The other renewable feedstock typically contains varying amounts of impurities, such as metals, water, phosphorus, silicon, alkali metals, earth alkaline metals, lignin, etc.

The other renewable feedstock may originate from any renewable source, such as agricultural, wood processing industry and aqua-cultural sources.

The other renewable feedstock may originate from plants, animals, algae, fish and microbiological processes. Examples of such feedstocks are lipidic biomass feedstocks including low cost waste materials, side streams, by-products, refining waste and residues and sewage sludge, and any combinations thereof. Typically, the other renewable feedstocks have high density, which makes the purification there of difficult and inefficient.

The other renewable feedstock does not include acid oils.

In an embodiment, the other renewable feedstock is selected from the group consisting of fatty acid distillates from physical refining of plant oils or animal fats, distillers corn oil (DCO) from ethanol production, crude tall oil (CTO), waste cooking oils, lard, brown grease, trap grease, waste fats, low-grade oils, super critical water liquefaction oils (SCWL oils), pyrolysis oils, plant oils, animal fats and any combination thereof.

In an embodiment, a renewable feedstock selected from one or more of fatty acid distillates from physical refining of plant oils or animal fats, distillers corn oil (DCO) from ethanol production, crude tall oil (CTO), waste cooking oils, lard, brown grease, trap grease, waste fats, low-grade oils, super critical water liquefaction oils (SCWL oils), pyrolysis oils, plant oils, animal fats and any combination thereof is treated together with at least one acid oil, with the aqueous medium.

Preferably said pyrolysis oils are selected from catalytic pyrolysis oils and fast-pyrolysis oils.

In an embodiment, said another renewable feedstock comprises C4-C26 fatty acids.

In a preferable embodiment, said another renewable feedstock comprises crude tall oil.

In an embodiment, CTO is treated together with at least one acid oil, with the aqueous medium.

In an embodiment the renewable feedstock comprising fatty acids, comprises 20-95% by weight of acid oil or mixtures of acid oils, preferably 51-95% by weight.

In an embodiment the renewable feedstock comprising fatty acids, comprises 5-80% by weight, preferably 5-49% by weight of another renewable feedstock or a combination thereof.

In another embodiment the feedstock comprises 20-95% by weight of acid oil or mixtures of acid oils and up to 80% by weight of CTO, preferably 5-80% by weight of CTO.

In another embodiment the feedstock comprises 30-95% by weight of acid oil or mixtures of acid oils and up to 70% by weight of CTO, preferably 5-70% by weight of CTO.

In another embodiment the feedstock comprises 51-95% by weight of acid oil or mixtures of acid oils and preferably 5-49% by weight of CTO.

All the above defined other renewable feedstocks share the same characteristics in the sense that they contain very varying amounts and types of impurities that make them difficult to purify. They may also contain free fatty acids, which typically contain aliphatic carbon chains having from about 6 to about 26 carbon atoms, comprising aliphatic carbon chains that are saturated, or mono-, di- or polyunsaturated.

CTO is obtained from Kraft pulping of wood, especially coniferous wood, and it is mainly composed of saturated and unsaturated oxygen-containing organic compounds such as resin acids (mainly abietic acid and its isomers), fatty acids (mainly linoleic acid, oleic acid and linolenic acid), unsaponifiables, such as fatty alcohols, sterols and other alkyl hydrocarbon derivatives, as well as impurities. The composition of CTO varies to a great deal, depending on the type of wood used. The handling and cooking of the wood causes break down of the triglyceride structures and hence CTO does not contain any significant amounts of triglycerides. Typically, CTO contains impurities such as inorganic sulfur compounds, alkali metal compounds, residual metals such as Na, K, Ca, Fe, and Si and P. In CTO, phosphorus typically exists in phospholipids and nucleotides. CTO may contain from 35 to even close to 100% by weight of free fatty acids, typically from 40 to 70% by weight.

Purification

The renewable feedstock comprising fatty acids is subjected purification to obtain a stream comprising fatty acids (second stream) and an aqueous stream (first stream) comprising impurities. The purification process removes effectively the impurities but maintains the valuable organic compounds in the stream comprising fatty acids, without effecting hydrolysis of acylglycerols to any significant extent.

In the purification, the renewable feedstock comprising fatty acids, is treated with an aqueous medium.

Said aqueous medium comprises water, mixtures of water and steam, or mixtures of streams comprising water or water and steam, with water soluble and/or water miscible organic compounds. Said water soluble and/or water miscible organic compounds may be water soluble ketones, alcohols, aldehydes, phenols etc. Suitably water is used.

Said aqueous stream (aqueous streams) may be recirculated by recirculating at least part of streams comprising water, obtained from the present process, to the purification. Up to 50% by weight of the aqueous stream may be recirculated.

The recirculated water stream may comprise not more than 1 000 mg/kg of total organic carbon, preferably not more than 500 mg/kg.

The aqueous medium may comprise 90-100 wt %, preferably 93-100 wt % and particularly preferably 97-100 wt % of water.

In an embodiment the aqueous medium may comprise not more than 50 mg/kg phosphorus (P), not more than 50 mg/kg silicon (Si) and not more than 50 mg/kg of at least one of alkali metals, alkaline earth metals and metals of the groups VIIB and VIIIB of the Periodic table of elements.

In an embodiment, where recirculated streams comprising water are used, the aqueous medium may comprise not more than 3 wt % of water soluble and/or water miscible organic compounds, suitably 0.01-3 wt %. Said water soluble and/or water miscible organic compounds may be water soluble ketones, alcohols, aldehydes, phenols, acids etc., separated in the purification. Examples of such compounds are acetone, ethanol, 1-hydroxy-2-propanone, acetic acid, propanoic acid, butanoic acid, pentanoic acid, hexanoic acid, phenol, traces of larger acid e.g. octadecanoic acids, hexadecanoic acid, and glycerol. In an embodiment, the aqueous medium comprises an acid selected from sulphuric acid and C1-C10 organic acids.

The amount of the acid is from 0.01 to 3 wt % calculated based on the total feed to the reactor, i.e. on the renewable feedstock comprising fatty acids. The amount of the acid is calculated as 100%.

The total amount of the acid is not more than 3 wt %. Preferably the amount of the acid is 0.1-2 wt %, particularly preferably 0.5-1.5 wt %.

The C1-C10 organic acid is preferably EDTA or C1-C6 organic acid selected from citric acid, formic acid, oxalic acid, acetic acid, butyric acid, valeric acid, caproic acid and propionic acid.

In a preferable embodiment the acid is sulfuric acid. In an embodiment sulphuric acid having concentration of 96 wt % is used.

In an embodiment, the feedstock is treated with the aqueous medium comprising an acid, and a first stream is separated, whereby the pH of the first stream is in the range from 0 to 6.5, preferably from 0.1 to 4. In a more preferable embodiment, the pH of the first stream is from 0.1 to 3.7.

In a preferable embodiment the acid id mixed with the aqueous medium prior to mixing with the feedstock.

The low pH range enables removing alkali metals, alkaline earth metals and other metals from the feedstock efficiently and rapidly.

In an embodiment, the purification is carried out at the temperature from 140 to 195° C. In a preferable embodiment, the purification is carried out at the temperature from 140 to 190° C. In a more preferable embodiment, the purification is carried out at the temperature from 145 to 185° C. In an even more preferable embodiment the purification is carried out at the temperature from 145 to 180° C.

In an embodiment, the purification is carried out under a pressure from 0.1 to 70 bar (abs). In a preferable embodiment, the purification is carried out under a pressure from 1 to 60 bar (abs). In a more preferable embodiment, the purification is carried out under a pressure from 3 to 30 bar (abs).

In the purification, the amount of the renewable feedstock comprising fatty acids, is from 20 to 80 wt % and the amount of the aqueous medium is 80 to 20 wt %, respectively, and the ratio is from 1:5 to 5:1, respectively and preferably from 1:1 to 3:1.

The purification may be carried out as a batch process or a continuous process.

The purification may be carried out in any suitable reactor or reactor configuration, such as batch reactor, plug-flow reactor, stirred tank reactor, a reactor tower, column reactor, or counter current extraction column.

In an embodiment, the purification is carried out as a continuous countercurrent process, suitably using an extraction column. A continuous countercurrent purification of the feedstock is particularly suitable for larger industrial scale.

In an embodiment, the residence time in the purification is from 10 min to 12 hours. In another embodiment, the residence time is from 15 min to 3 hours. In a preferable embodiment, the residence time is from 30 min to 2 hours.

Typically, the removal of metals takes place rapidly, particularly in the presence of an acid. Phosphorus and silicon are also removed rapidly, depending on the quality of the feedstock and the selection of process parameters.

An aqueous stream (first stream) comprising impurities and a stream comprising fatty acids (second stream) are separated from the mixture obtained from the purification. The purification and separation may be carried out simultaneously, for example using an extraction column. Alternatively, the separation may be carried out using any suitable method based on gravitational separation or separation by centrifugal force. Examples of suitable separation devices are separation vessels, decantation vessels, decanters and disk stack centrifuges.

The second stream comprising fatty acids may also comprise unsaponifiables, such as sterols, carotenes, etc., depending of the composition of the feedstock.

The aqueous stream (first stream) typically comprises P, Si, alkali metal, alkaline earth metal and other metal impurities, and some water-soluble or water-miscible organic compounds, if any. Said organic compounds may be water soluble ketones, alcohols, aldehydes, phenols, acids etc. Examples of such compounds are acetone, ethanol, 1-hydroxy-2-propanone, acetic acid, propanoic acid, butanoic acid, pentanoic acid, hexanoic acid, phenol, traces of larger acid e.g. octadecanoic acids, hexadecanoic acid and glycerol.

In an embodiment, at least part of the aqueous stream (first stream) is recycled to the aqueous medium, whereby the amounts of waste water streams can be reduced.

The purification may be carried out under inert atmosphere, using suitably $N_2$ or $CO_2$ atmosphere.

The water used in the aqueous medium is suitably de-aerated and demineralized or softened prior to introducing to the purification.

In an embodiment, steam may be used for providing energy to the purification, for improving mixing in the purification vessel, replacing part of the water in the aqueous medium and for maintaining the temperature. Steam may be introduced in the purification step.

The feed rate of steam is up to 500 kg/t feed, suitably 30-500 kg/t feed, more suitably 50-500 kg/t feed of steam is used and particularly suitably 50-400 kg/t feed.

Steam is suitably injected at least to one location of the purification vessel/reactor. If the vessel/reactor is arranged vertically the steam is injected suitably to the bottom, or to the middle of the vessel/reactor or to the top of the vessel/reactor. The steam can also be injected to two locations or to the at least three locations: to the bottom, middle and top of the reactor, for providing rapidly sufficient heat to the mixture. Steam provides additionally mixing of the reaction mixture.

The purification is suitably operated such to maintain the free fatty acid structure of the feedstock and to avoid hydrolysis of acylglycerols to glycerol as a by-product, in the case acylglycerols were present in the feedstock. Any glycerol formed as by-product is removed with the aqueous stream comprising impurities.

In the purification, phospholipids are selectively hydrolysed whereby the phosphorus can be found in the aqueous phase and the liberated fatty acid in the oil phase.

In an embodiment, the second stream may be directed to drying for removing residual water in the oil. Drying may be carried out using any suitable drying apparatus, such as decantation, gravitational separation, centrifugation, evaporation apparatus etc.

Optionally, the stream comprising fatty acids (second stream), obtained from the purification may be directed to a fractionation step or to a hydroprocessing step, or to another process.

Optionally, at least part of the first stream is recirculated to the aqueous medium, for use in the purification of the feedstock.

Optionally the recirculated first stream is subjected to a pretreatment step for removing at least part of the impurities, prior to introducing to the recirculation.

Optional Fractionation of the Second Stream

The stream comprising fatty acids (second stream), which has optionally been subjected to drying, may optionally be fractionated in a fractionation step. A gaseous fraction, if any, a light liquid fraction and a heavy liquid fraction may be obtained.

The gaseous fraction typically comprises water and light gaseous (C1-C4) compounds.

The light liquid fraction typically comprises fatty acids having carbon number C4-C26, optionally acylglycerols, esters and unsaponifiables, depending on the composition of the feedstock.

The heavy liquid fraction typically comprises C24 and heavier fatty acids, and polymerized compounds.

In an embodiment, the light liquid fraction, obtained by the fractionation of said stream comprising fatty acids, is optionally directed to a hydroprocessing step.

The fractionation of the second stream comprising free fatty acids may be carried out as evaporation, distillation or as a combination of evaporation and distillation.

Examples of suitable evaporation methods are those utilizing thin film evaporation technology. The evaporators in the evaporation methods can thus be selected from the group consisting of thin film evaporators, falling film evaporators, short path evaporators, plate molecular stills and any other evaporators using thin film evaporation technology.

The evaporation may be carried out in an evaporation unit, which may comprise one, two, three, four or more evaporators which can be either of the same type or different type and are selected independently from the above listed evaporators. If the evaporation unit comprises more than one evaporator, the evaporators are suitably arranged in series.

Having more than one evaporating steps, provides the advantage that the boiling in the evaporation steps following the first step takes place in a more controlled manner because low boiling light components do not cause so much "carry over", i.e. migrating of the impurities to the vapour.

When two or more evaporators are employed, the temperature is typically increased successively from the first to the second and subsequent evaporators.

Alternatively, the fractionation may be carried out using vacuum distillation methods known in the art. Fractions comprising the gaseous fraction, the light liquid fraction and the heavy liquid fraction can be separated. A person skilled in the art is able to vary the fractionation/distilling conditions and to change the temperature cut point as desired to obtain any desired fraction, boiling in the predetermined ranges.

Alternatively, a combination of the at least one evaporation step or evaporator with vacuum distillation may also be used.

Optional Hydroprocessing Step

The hydroprocessing step may be carried out for effecting at least one of hydrodeoxygenation, hydrodewaxing, hydroisomerization, hydrocracking, hydrodearomatization and ring opening reactions.

In an embodiment, the second stream comprising fatty acids, or a light liquid fraction (comprising C4-C26 free fatty acids) obtained by fractionation of the second stream, may be subjected to a catalytic hydroprocessing step carried out in the presence of hydrogen, to yield an effluent, which may be subjected to a second fractionation and/or further processing steps for providing liquid fuels and other chemicals. Also, gasoline fractions may also be produced that can be used as a bio-naphtha component or as raw material for bio-plastics.

Hydroprocessing may be performed using one or more hydroprocessing catalysts comprising one or more metals selected from Group VIA and Group VIII metals (Periodic Table of Elements). Particularly useful examples are Mo, W, Co, Ni, Pt and Pd. The catalyst(s) can also contain one or more support materials, for example zeolite, alumina ($Al_2O_3$), gamma-alumina, zeolite-alumina, alumina-silica ($SiO_2$), $ZrO_2$, alumina-silica-zeolite and activated carbon. Suitably a mixture of CoO and $MoO_3$ (CoMo) and/or a mixture of NiO and $MoO_3$ (NiMo), and/or a mixture of Ni, Mo and Co and/or NiW and one or more support materials selected from zeolite, alumina, silica, zeolite-alumina, alumina-silica, alumina-silica-zeolite and activated carbon. Also, noble metals, such as Pt and/or Pd dispersed on gamma-alumina may be used.

In an embodiment, the hydroprocessing is carried out under a pressure of 5-300 bar (total pressure, abs). In an embodiment, the pressure in the hydroprocessing is from 30 to 250 bar, suitably from 30 to 120 bar.

In an embodiment, hydrogen partial pressure is maintained in the range from 50 to 250 bar, suitably from 80 to 200 bar, particularly suitably from 80 to 110 bar.

The hydroprocessing is carried out at a temperature in the range of 100 to 450° C., suitably 280° C. to 450° C., more suitably from 350° C. to 400° C.

The hydroprocessing feed rate WHSV (weight hourly spatial velocity) of the feedstock oil is proportional to an amount of the catalyst. The WHSV of the feed material varies between 0.1 and 10, it is suitably in the range of 0.1-5 and preferably in the range of 0.3-0.7.

The ratio of $H_2$/feed varies between 600 and 4000 Nl/l, suitably of 1300-2200 Nl/l.

The feed is pumped to the hydroprocessing reactor at a desired speed. Suitably the feed rate LHSV (liquid hourly space velocity) of the feed material is in the range of 0.01-10 $h^{-1}$, suitably 0.1-5 $h^{-1}$.

The hydroprocessing step may be carried out as at least one-step process or as at least two-step process.

The liquid hydrocarbon stream obtained from the hydroprocessing reactor system includes fuel grade hydrocarbons having a boiling point of at most 380° C. according to ISO EN 3405. The person skilled in the art is able to vary the distilling conditions and to change the temperature cut point as desired to obtain any suitable hydrocarbon product, boiling suitably in the transportation fuel ranges.

The purification process provides several advantageous effects.

The benefits of this process are that it is able to remove particularly effectively phosphorus and alkali metals, alkaline earth metals and other metals from low grade waste materials and residue oils and fats, which contain free fatty acids, without producing waste water streams containing significant amounts of dissolved BOD/COD (glycerol), without breaking or degrading valuable feed materials, without effecting hydrolysis of acylglycerols, or at least maintaining said hydrolysis on a very negligible level.

Furthermore, it has a high yield compared to processes utilizing centrifugation and/or absorption in purification. Release of phosphorus in the atmosphere by burning or dumping in the environment can be avoided and low value impure feeds can be converted to useful products.

With the purification process, purified feedstock comprising fatty acids is provided, having low contents of P, Si, metals, alkali metals, alkaline earth metals and other metals, and being particularly suitable as feedstock for catalytic hydroprocessing, where poisoning and inactivation of the catalysts can be avoided, as well as phosphorus promoted harmful side reactions in the hydroprocessing and during storage of the product obtained from the purification of feedstock.

The simple and cost-effective purification process allows the use of flexible feedstocks comprising high amounts of fatty acids and impurities, and the separation of the phases after the purification is easy and economic.

The use of the feedstock comprising a combination of acid oil with another renewable feedstock, such as CTO, provides a simplified process, because only one purification line is needed for treating both feed materials, the feedstock oils can be mixed in a wide ratio, and the purified oils can be stored combined in the same tank together.

Further, many of the other renewable feedstocks, particularly CTO tends to form water emulsions if treated alone. The combining of CTO with acid oil results in that the formation of emulsion can be avoided. Additionally, the acid oils lower the density of CTO, which also improves the purification. Yield losses are significantly reduced in the purification. The purification process has a high yield compared to processes utilizing degumming, bleaching, centrifugation and/or absorption in purification. Particularly the carbon yield is high, typically at least 98%, indicating that very low amounts of organic compounds are lost in the purification process.

Recycling of the aqueous phase decreases the amount of needed fresh water.

EXAMPLES

Examples 1-6

In the examples 1-6, soy acid oil (AO) and crude tall oil (CTO) were mixed, and the obtained mixture was mixed at room temperature with the aqueous medium (distilled water). The oil to water ratio was 1:1. In the examples 3 and 4, 0.5 wt % of sulphuric acid was added to the aqueous medium, and in examples 5 and 6, 1 wt % of sulphuric acid was added to the aqueous medium. The examples were performed using a batch reactor.

The mixture comprising the feedstock, aqueous medium and optionally the sulphuric acid was introduced in the reactor, the reactor was closed and flushed with $N_2$ to remove any air. The reactor was heated up to the reaction temperature. At the temperatures which was used in the examples, the water was in the liquid phase (the pressure was above the water vapor pressure).

The mixture was mixed using a mixing speed of 500 rpm. After the tests, the reactor was cooled down, the pressure in the reactor was released and the reactor was opened. The two liquid phases, oil phase (stream comprising fatty acids) and aqueous phase (aqueous stream comprising impurities), were separated and analyzed.

The oil phase was characterized using GCMS (Gas Chromatography—Mass Spectrometry) to identify the composition and ICP-analysis (ICP=Inductively Coupled Plasma) for the quantification of P and alkali metals, alkaline earth metals and other metals. For the oil phases, also water content was analyzed. The pH and the total organic content (TOC) of the aqueous phase was measured as an indication of the carbon lost to this phase.

The results are presented in Table 1 below.

but without the acid. The results presented in the Table 1 shows that the addition of acid enhances, particularly at the temperature of 180° C. the purification procedure and reduces the TOC in the aqueous phase.

Sulfuric acid is particularly suitable. Also, as the pH of the aqueous phase after the purification procedure with sulfuric acid is low, this aqueous phase can be recirculated reducing the amount of fresh water and acid needed.

The present invention has been described herein with reference to specific embodiments. It is, however, clear to those skilled in the art that the process(es) may be varied within the bounds of the claims.

The invention claimed is:

1. A process for purifying renewable feedstock comprising fatty acids, wherein said process comprises the steps, where the renewable feedstock comprising fatty acids comprises at least one acid oil and at least another renewable feedstock, and said renewable feedstock comprising fatty acids is treated with an aqueous medium, at the temperature from 140 to 195° C., under a pressure from 0.1 to 70 bar (abs), and where the ratio of the renewable feedstock comprising fatty acids to the aqueous medium is from 1:5 to 5:1, respectively, to obtain a mixture, and a first stream comprising water and a second stream comprising fatty acids are separated from said mixture, and the second stream is obtained as purified renewable feedstock, wherein the renewable feedstock comprising fatty acids comprises 20-95 wt % of acid oil or mixtures of acid oils.

2. The process according to claim 1, wherein the purified renewable feedstock comprises not more than 50 mg/kg phosphorus, calculated as elemental phosphorus.

3. The process according to claim 1, wherein the purified renewable feedstock comprises not more than 100 mg/kg of alkali metals, alkaline earth metals, metals of the groups VIIB and VIIIB of the Periodic table of elements, or combinations thereof, calculated as elemental metals.

4. The process according to claim 1, wherein the first stream comprising water comprises not more than 10 000 mg/kg total organic carbon.

5. The process according to claim 1, wherein the purified renewable feedstock comprises not more than 50 mg/kg phosphorus and not more than 100 mg/kg alkali metals, alkaline earth metals, metals of the groups VIIB and VIIIB of the Periodic table of elements, or combinations thereof,

TABLE 1

|  | AO + CTO | Ex. 1 T = 150° C. | Ex. 2 T = 180° C. | Ex. 3 T = 150° C. 0.5 wt-% acid | Ex. 4 T = 180° C. 0.5 wt-% acid | Ex. 5 T = 150° C. 1 wt-% acid | Ex. 6 T = 180° C. 1 wt-% acid |
|---|---|---|---|---|---|---|---|
| Oil phase |  |  |  |  |  |  |  |
| Metals mg/kg | 2439.2 | 1520.1 | 1497.9 | 47.8 | 0.0 | 7.3 | 4.3 |
| P mg/kg | 126.0 | 23.4 | 6.0 | 35.2 | <1 | 46.4 | 13.5 |
| Water content wt-% |  | 1.3 | 1.9 | 1.0 | 0.8 | 0.9 | 0.8 |
| Aqueous phase |  |  |  |  |  |  |  |
| TOC mg/kg |  | 6116 | 7607.0 | 3172.0 | 4086.0 | 3282.0 | 4460.0 |
| pH |  | 6.3 | 6.3 | 1.3 | 1.2 | 0.7 | 0.7 |

\* Oil = oil phase; Water = aqueous phase
\* Metals include alkali metals, alkaline earth metals and metals of the groups VIIB and VIIIB of periodic table of elements The results of acid addition are compared to the results achieved for purifications carried out at the same conditions and the first stream comprising water comprises not more than 10 000 mg/kg total organic carbon.

6. The process according to claim 1, wherein the aqueous medium comprises 0.01 to 3 wt % of an acid selected from sulphuric acid and C1-C10 organic acids, calculated based on the renewable feedstock comprising fatty acids.

7. The process according to claim 6, wherein the C1-C10 organic acid is EDTA or C1-C6 organic acid selected from citric acid, formic acid, oxalic acid, acetic acid, butyric acid, valeric acid, caproic acid and propionic acid.

8. The process according to claim 6, wherein the acid is sulphuric acid.

9. The process according to claim 1, wherein the aqueous medium comprises water, mixtures of water and steam, or mixtures of streams comprising water or water and steam, with water soluble and/or water miscible organic compounds.

10. The process according to claim 1, wherein the other renewable feedstock is selected from the group consisting of fatty acid distillates from physical refining of plant oils or animal fats, distillers corn oil from ethanol production, crude tall oil, waste cooking oils, lard, brown grease, trap grease, waste fats, low-grade oils, super critical water liquefaction oils, pyrolysis oils, plant oils, animal fats and any combination thereof.

11. The process according to claim 1, wherein the other renewable feedstock comprises crude tall oil.

12. The process according to claim 1, wherein the renewable feedstock comprising fatty acids comprises 5-80 wt % of another renewable feedstock or a combination thereof.

13. The process according to claim 1, wherein the renewable feedstock comprising fatty acids comprises 30-95 wt % of acid oil or mixtures of acid oils and 5-70 wt % of crude tall oil.

14. The process according to claim 1, wherein the aqueous medium comprises not more than 3 wt % of organic compounds.

15. The process according to claim 1, wherein the temperature is from 140 to 190° C.

16. The process according to claim 1, wherein the pressure is from 1 to 60 bar (abs).

17. The process according to claim 1, wherein the residence time is from 10 min to 12 hours.

18. The process according to claim 1, wherein the pH of the first stream is in the range from 0 to 6.5.

19. The process according to claim 1, wherein the second stream is fractionated to obtain a gaseous fraction, a light liquid fraction and a heavy liquid fraction.

20. The process according to claim 1, wherein at least part of the first stream is recirculated to the aqueous medium.

21. The process according to claim 1, wherein the carbon yield is at least 98%.

22. The process according to claim 1, wherein the purified renewable feedstock comprises not more than 10 mg/kg phosphorus, calculated as elemental phosphorus.

23. The process according to claim 1, wherein the purified renewable feedstock comprises not more than 50 mg/kg of alkali metals, alkaline earth metals, metals of the groups VIIB and VIIIB of the Periodic table of elements, or combinations thereof, calculated as elemental metals.

24. The process according to claim 1, wherein the aqueous medium comprises 0.01 to 3 wt % of organic compounds.

25. The process according to claim 1, wherein the temperature is from 145 to 185° C.

26. The process according to claim 1, wherein the residence time is from 15 min to 3 hours.

27. The process according to claim 1, wherein the pH of the first stream is in the range from 0.1 to 4.

* * * * *